E. A. SMEAD.
Corn Sheller.
No. 28,612.
Patented June 5, 1860.
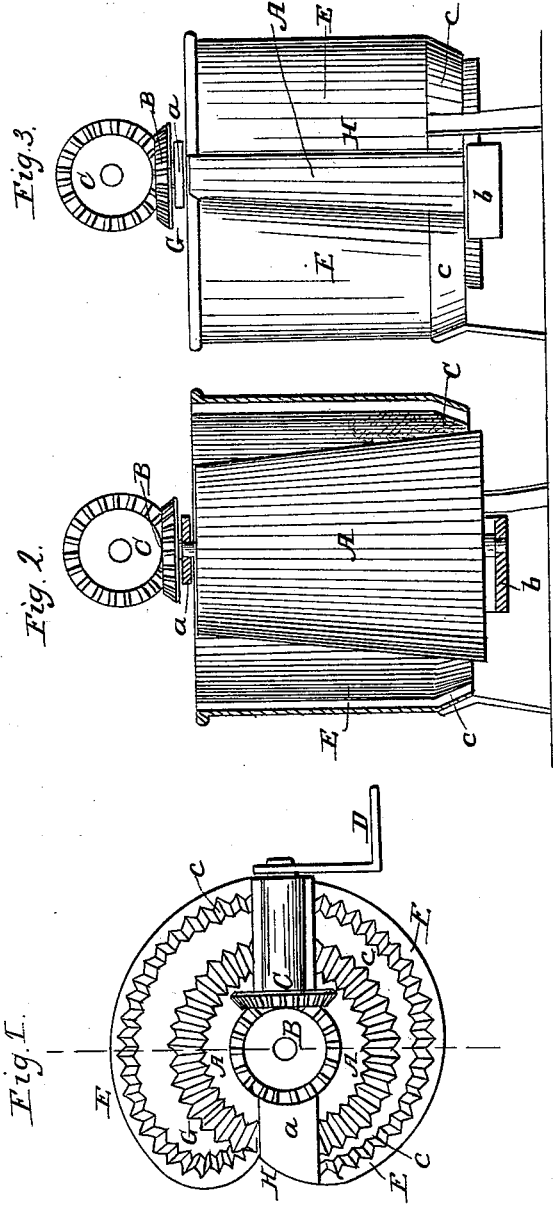
Witnesses:
Inventor.

UNITED STATES PATENT OFFICE.

E. A. SMEAD, OF TIOGA, PENNSYLVANIA.

CORN-SHELLER.

Specification of Letters Patent No. 28,612, dated June 5, 1860.

*To all whom it may concern:*

Be it known that I, E. A. SMEAD, of Tioga, in the county of Tioga and State of Pennsylvania, have invented a new and Improved Corn-Sheller; and I do hereby declare that the following is a full, clear, and exact description of the same, reference being had to the accompanying drawings, forming a part of this specification, in which—

Figure 1 represents a plan or top view of my machine, with the cover and hopper removed. Fig. 2 is a vertical diametrical section, taken through Fig. 1, as indicated by the red line $x$, $x$, therein. Fig. 3 is a vertical exterior view showing the discharge opening for the shelled ears.

Similar letters of reference indicate corresponding parts in the three figures.

To enable those skilled in the art to fully understand my invention I will proceed to describe its construction and operation.

In the drawings, A represents a fluted drum having the form of a conic frustum, standing in a perpendicular position and having its bearings in bars, $a$, $b$, which extend across the top and bottom of the machine; this shelling drum is rotated by bevel gearing, B C, and a crank, D. Surrounding said drum is a fluted concave, E, having the form of a scroll, described from the axis of the drum, A, and gradually diminishing from the feeding point, G, to the place of discharge, H, which is a vertical opening shown clearly by Fig. 3. The edge of the concave at G, is turned up close to the periphery of the shelling drum, A, so that the ears of corn may not escape at this point, and the bottom edge, $c$, of the concave is turned under so as to come sufficiently close to the base of the conical drum to prevent the ears from escaping through the bottom of the machine during the operation of shelling.

The top of the machine may be covered, if necessary, and a hopper provided for feeding the ears down between the concave and drum. The hopper in not shown in the figures referred to.

It will now be evident that the ears of corn which are fed into the machine at G, between two fluted or ribbed surfaces cannot escape therefrom until they have passed entirely around the drum, A, and reached the point, H; the cobs are then rapidly discharged with the grain perfectly removed from them.

The ears are fed in, G, between the shelling drum and concave with their points down, and should they be exceedingly large ears, the shelling will commence immediately they have fallen from the hopper and are received by the shelling surfaces; but should the ears be small they will fall nearer the bottom of the drum before the shelling proceeds, that portion of the concave turned under, shown clearly by Fig. 2, will receive the points of the ears and thoroughly free them of the corn which falls freely through the open bottom. The rotary motion of the drum, A, will impart to each ear a rapid rotary and revolving motion around said drum and effectually shell the corn from the cobs before they arrive at the discharge opening.

I do not claim broadly the invention of a cylindrical shell, drum and conical shelling drums, but

Having thus described my invention, I claim and desire to secure by Letters Patent—

The employment of an upright scroll shaped shell E, and drum A, constructed arranged and operating in respect to each other as herein shown, and described for the purpose set forth.

E. A. SMEAD.

Witnesses:
 B. GIROUSE,
 CHS. M. HUGHES.